US012452657B2

United States Patent
Guo et al.

(10) Patent No.: US 12,452,657 B2
(45) Date of Patent: Oct. 21, 2025

(54) AUTHENTICATION BETWEEN WIRELESS DEVICES AND EDGE SERVERS

(71) Applicant: Apple Inc., Cupertino, CA (US)

(72) Inventors: Shu Guo, Beijing (CN); Dawei Zhang, Saratoga, CA (US); Huarui Liang, Beijing (CN); Haijing Hu, Beijing (CN)

(73) Assignee: Apple Inc., Cupertino, CA (US)

( * ) Notice: Subject to any disclaimer, the term of this patent is extended or adjusted under 35 U.S.C. 154(b) by 558 days.

(21) Appl. No.: 17/916,960

(22) PCT Filed: Oct. 28, 2021

(86) PCT No.: PCT/CN2021/127031
§ 371 (c)(1),
(2) Date: Oct. 4, 2022

(87) PCT Pub. No.: WO2023/070433
PCT Pub. Date: May 4, 2023

(65) Prior Publication Data
US 2023/0276231 A1 Aug. 31, 2023

(51) Int. Cl.
*H04M 1/66* (2006.01)
*H04W 12/041* (2021.01)
*H04W 12/06* (2021.01)
*H04W 12/69* (2021.01)
*H04W 60/04* (2009.01)

(52) U.S. Cl.
CPC ......... *H04W 12/041* (2021.01); *H04W 12/06* (2013.01); *H04W 12/69* (2021.01); *H04W 60/04* (2013.01)

(58) Field of Classification Search
CPC ... H04W 12/06; H04W 12/02; H04W 12/065; H04W 12/069; H04W 12/041; H04W 12/69; H04W 12/04; H04L 9/0838
See application file for complete search history.

(56) References Cited

U.S. PATENT DOCUMENTS

| | | | |
|---|---|---|---|
| 10,582,380 B2 * | 3/2020 | Lehtovirta | ............ H04L 9/0866 |
| 2014/0006786 A1 | 1/2014 | Campagna | |
| 2019/0200283 A1 * | 6/2019 | Graybeal | .............. H04W 48/18 |
| 2020/0359218 A1 | 11/2020 | Lee | |
| 2022/0029994 A1 * | 1/2022 | Choyi | .................. H04L 63/0892 |
| 2023/0070253 A1 * | 3/2023 | Rajadurai | ............. H04W 12/06 |

FOREIGN PATENT DOCUMENTS

| | | |
|---|---|---|
| CN | 108173882 | 6/2018 |
| CN | 108810026 | 11/2018 |

OTHER PUBLICATIONS

International Search Report and Written Opinion for PCT Patent Application No. PCT/CN2021/127031; 5 pages; Jul. 29, 2022.

* cited by examiner

*Primary Examiner* — Shantell L Heiber
(74) *Attorney, Agent, or Firm* — Kowert, Hood, Munyon, Rankin & Goetzel, P.C.

(57) ABSTRACT

This disclosure relates to techniques for performing wireless communications including authentication between user equipment and edge computing servers. One or more edge enabler client(s) operating at a user equipment may authenticate with one or more edge computing server(s). The authentication may use generic bootstrapping architecture, among various possibilities.

20 Claims, 10 Drawing Sheets

AUTHENTICATION BETWEEN WIRELESS DEVICES AND EDGE SERVERS

PRIORITY CLAIM

This application is a national phase entry of PCT application number PCT/CN2021/127031, entitled "Authentication Between Wireless Devices and Edge Servers," filed Oct. 28, 2021, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless communication, including to authentication between wireless devices and edge servers.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost, low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. One characteristic may be increasing communication between wireless devices and edge servers. Improvements in the field are desired.

SUMMARY

Embodiments are presented herein of, inter alia, systems, apparatuses, and methods for performing packet filtering and related communications in a wireless communication system, e.g., New Radio (NR), LTE, etc.

As noted above, the number of use cases for wireless networks communicating with different classes of user equipment devices (UEs) with widely variable capabilities and usage expectations are growing. One usage expectation may include performing authentication between UE(s) and edge computing servers.

In some embodiments, a method performed by a user equipment (UE) may include performing a first bootstrapping procedure with a first edge server, the first bootstrapping procedure including generating a first key. The UE may generate a first authentication code for a first edge enabler client (EEC) operating at the UE, wherein the first authentication code is for use with the first edge server, and may transmit a first registration request for the first EEC to the first edge server, the first registration request including the first authentication code. The UE may receive, from the first edge server, a first registration success message comprising first information for authenticating with a second edge server. The UE may generate a second authentication code for the first EEC, wherein the second authentication code is for use with the second edge server and transmit a second registration request for the first EEC to the second edge server, the second registration request including the second authentication code. The UE may receive, from the second edge server, a second registration success message comprising second information for discovery of a third edge server and may discover the third edge server using the second information.

In some embodiments, a method at an edge configuration server may comprise establishing communication with a bootstrapping server function (BSF). The server may receive, from the BSF, a first key associated with a first user equipment (UE). The server may establish communication with the UE and receive, from a first edge enabler client (EEC) of the UE, a first application registration request comprising: an identifier of the first EEC; and a first authentication code. The server may verify the first authentication code based on the first key and the identifier of the first EEC, and, in response to successfully verifying the first authentication code, provide, to the UE, information for authenticating an edge enablement server.

The techniques described herein may be implemented in and/or used with a number of different types of devices, including but not limited to cellular phones, tablet computers, wearable computing devices, portable media players, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
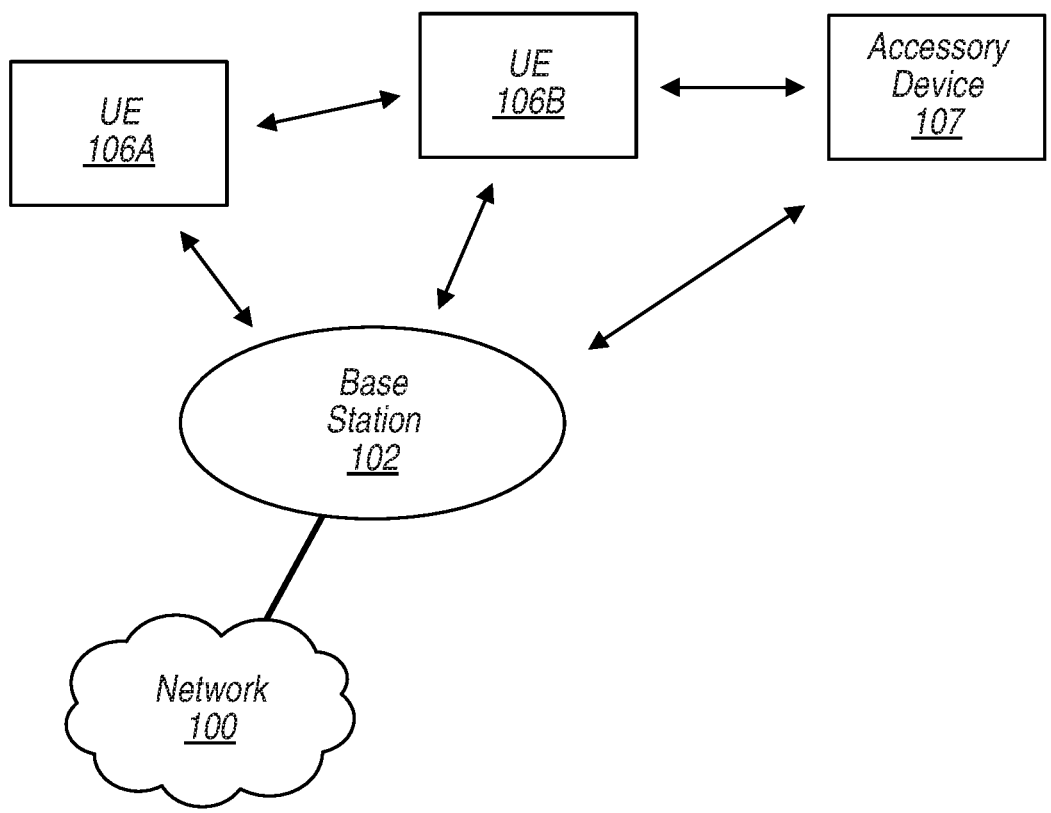
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms and Abbreviations

The following acronyms and abbreviations are used in the present disclosure.

3GPP: Third Generation Partnership Project
3GPP2: Third Generation Partnership Project 2
GSM: Global System for Mobile Communications
GSMA: GSM Association
ITU: International Telecommunication Union
UMTS: Universal Mobile Telecommunications System
LTE: Long Term Evolution
RRC: Radio Resource Control
MAC: Media Access Control
CE: Control Element
Tx: Transmission (or transmit)
Rx: Reception (or receive)
RS: Reference Signal
CSI: Channel State Information
ECS: Edge Configuration Server
EEC: Edge Enabler Client
EES: Edge Enabler Server
EEC ID: Edge Enabler Client Identifier
EDN: Edge Data Network
GBA: Generic Bootstrapping Architecture
AKA: Authentication and Key Agreement
B-TID: Bootstrapping Transaction Identifier
BSF: Bootstrapping Server Function
GAA: Generic Authentication Architecture
HLR: Home Location Register
HSS: Home Subscriber System
IK: Integrity Key
KDF: Key Derivation Function
NAF: Network Application Function
PM: Public Key Infrastructure
IP: Internet Protocol
TMPI: Temporary IP Multimedia Private Identity
IMPI: IP Multimedia Private Identity

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, vehicle, automobile, unmanned aerial vehicles (e.g., drones) and unmanned aerial controllers, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well as any of various combinations of the above.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
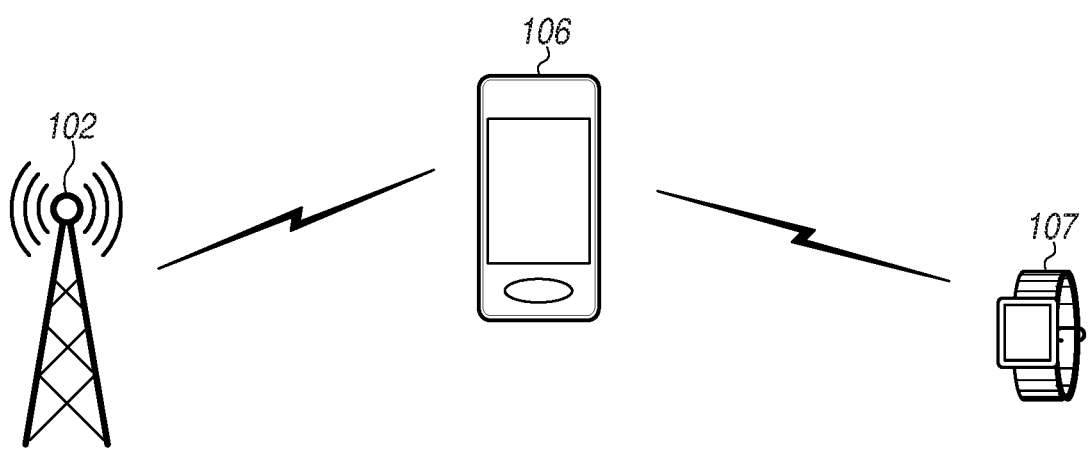
FIG. 2 illustrates an example wireless communication system in which two wireless devices can perform direct device-to-device communication, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware and/or software that enables wireless communication with the UE devices 106A, 106B, and 107. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. As also used herein, from the perspective of UEs, a base station may sometimes be considered as representing the network insofar as uplink (UL) and downlink (DL) communications of the UE are concerned. Thus, a UE communicating with one or more base stations in the network may also be interpreted as the UE communicating with the network.

In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1×RTT, 1×EV-DO, HRPD, eHRPD), Wi-Fi, etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000, LTE, LTE-A, NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi. In some instances, the UE 106B and the accessory device 107 may perform direct peer-to-peer communication using proximity services (ProSe) techniques, e.g., in a manner supported by a cellular base station. For example, such ProSe communication may be performed as part of a relay link to support a radio resource control connection between the accessory device 107 and the BS 102, such as according to various embodiments described herein.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. For example, it may be the case that the UE 106A and UE 106B are capable of arranging and performing D2D communication (e.g., including discovery communications) with each other even when out-of-coverage of the BS 102 and other cellular base stations.

The BS 102 may control one or more transmission and reception points (TRPs) and may use the TRPs to communicate with the UEs. The TRPs may be collocated with the BS and/or at separate physical locations.

FIG. 2 illustrates an example BS 102 in communication with a UE device 106, which in turn is in communication with an accessory device 107. The UE device 106 and accessory device 107 may be any of a mobile phone, a tablet, or any other type of hand-held device, a smart watch or other wearable device, a media player, a computer, a laptop, unmanned aerial vehicle (UAV), unmanned aerial controller, vehicle, or virtually any type of wireless device. In some embodiments, the accessory device may be a wireless device designed to have low cost and/or low power consumption, and which may benefit from use of a relay link with the UE device 106 (and/or another companion device) to support communication with the BS 102. A device that utilizes a relay link with another wireless device to communicate with a cellular base station, such as in the illustrated scenario of FIG. 2, may also be referred to herein as a remote wireless device, a remote device, or a remote UE device, while a wireless device that provides such a relay link may also be referred to herein as a relay wireless device, a relay device, or a relay UE device. According to some embodiments, such a BS 102, UE 106, and accessory device 107 may be configured to perform radio resource control procedures for remote wireless devices in accordance with various of the techniques described herein.

The UE 106 and accessory device 107 may each include a device or integrated circuit for facilitating cellular communication, referred to as a cellular modem. The cellular modem may include one or more processors (processing elements) that is configured to execute program instructions stored in memory, and/or various hardware components as described herein. The UE 106 and/or accessory device 107 may each perform any of the method embodiments described herein by executing such stored instructions. Alternatively, or in addition, the UE 106 and/or accessory device 107 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or accessory device 107 may include one or more antennas for communicating using one or more wireless communication protocols according to one or more RAT standards. In some embodiments, one or both of the UE 106 or accessory device 107 might be configured to communicate using a single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

Alternatively, the UE 106 and/or accessory device 107 may include two or more radios. For example, in some embodiments, the UE 106 and/or accessory device 107 may include separate transmit and/or receive chains (e.g., including separate antennas and other radio components) for each wireless communication protocol with which it is configured to communicate. As a further possibility, the UE 106 and/or accessory device 107 may include one or more radios that are shared between multiple wireless communication protocols, and one or more radios that are used exclusively by a single wireless communication protocol. For example, the UE 106 and/or accessory device 107 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
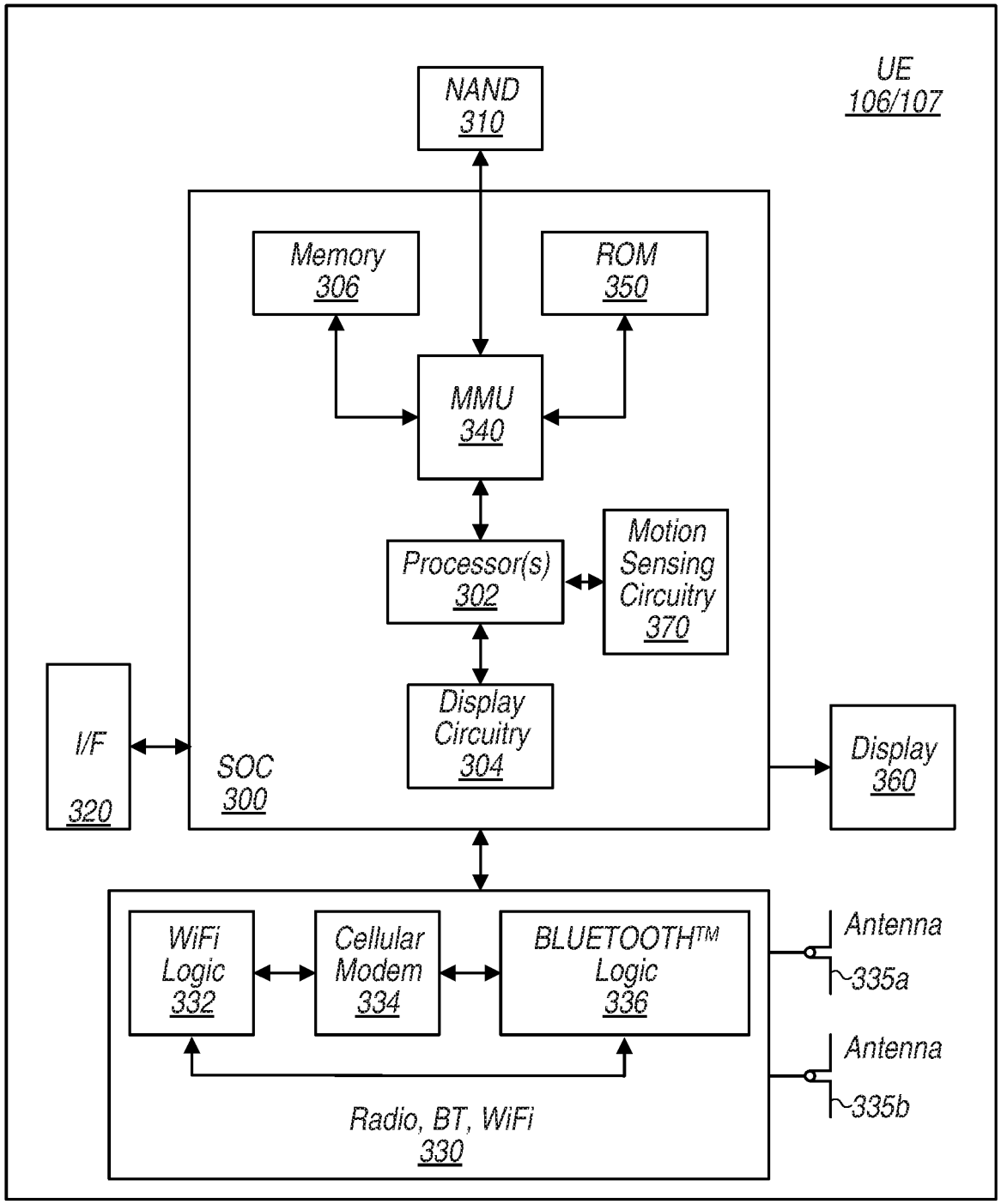
FIG. 3 is a block diagram illustrating an example wireless device, according to some embodiments.

FIG. 3—Block Diagram of a UE Device

FIG. 3 illustrates one possible block diagram of a UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310), and/or to other circuits or devices, such as the display circuitry 304, radio 330, I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using multiple wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. The processor(s) 302 of the UE device 106/107 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform radio resource control procedures for remote wireless devices according to various embodiments disclosed herein. Processor(s) 302 may also implement various other applications and/or end-user applications running on UE 106. Alternatively or additionally, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
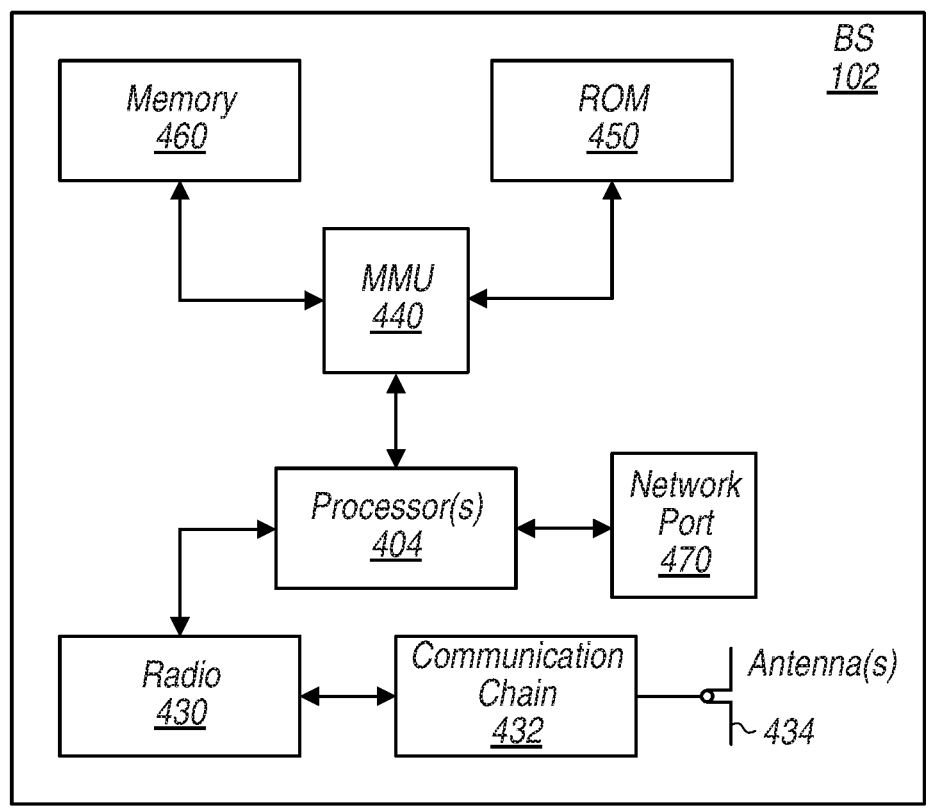
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and NR, LTE and Wi-Fi, LTE and UMTS, LTE and CDMA2000, UMTS and GSM, etc.).

As described further subsequently herein, the BS 102 may include hardware and software components for implementing or supporting implementation of features described herein. According to some embodiments, the processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of radio resource control procedures for remote wireless devices according to various embodiments disclosed herein, and/or any of various other of the features described herein.

Figure 5:
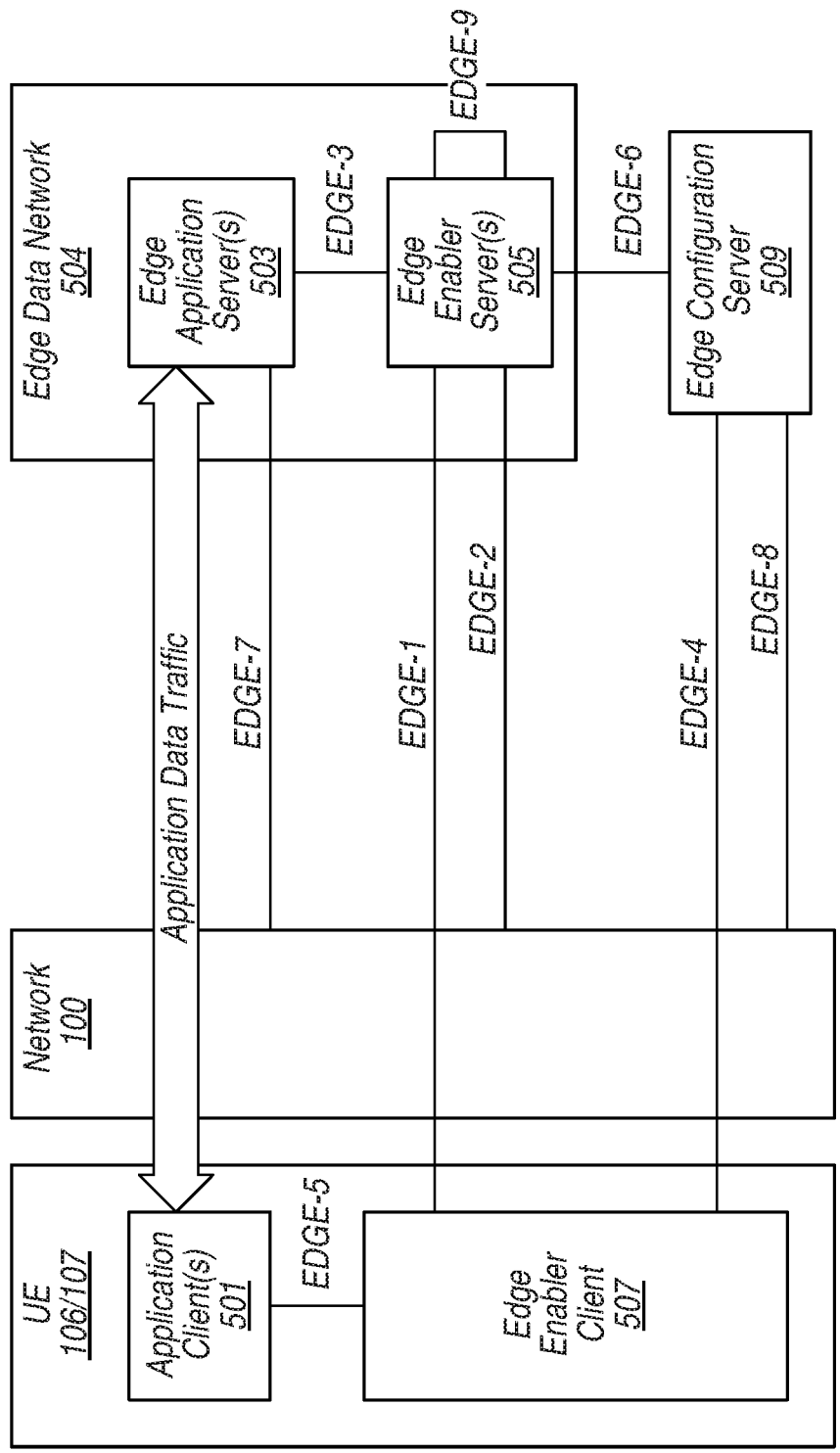
FIG. 5 is a block diagram illustrating an example edge computing architecture, according to some embodiments.

FIG. 5—Connections Between UEs and Edge Servers

FIG. 5 illustrates an example architecture for enabling edge applications, according to some embodiments. Various edge computing servers may interact with one or more applications (e.g., application client (AC) 501) executing on a UE, according to some embodiments. For example, an edge application server (EAS) 503 may exchange application data with a corresponding application client at the UE. Such exchange of data may occur via any number of intermediate devices. For example, the data may be exchanged via a network 100 such as a 3GPP core network, a 3GPP radio access network (RAN), the internet, and/or a wireless local area network (WLAN), etc., among various possibilities. Example applications that may use EAS include applications for weather, entertainment (e.g., mobile streaming, games), financial services, etc.

An edge data network (EDN) 504 may be a local data network. Any number of edge application server(s) 503 and edge enabler server(s) 505 may be contained within the EDN. An EES may be primarily responsible for enabling discovery of the EAS(s) by UEs. An edge enabler client (EEC) 507 may provide support functions, such as EAS discovery to the AC(s) 501 in the UE. An edge configuration server (ECS) 509 may provide configurations to the EEC to connect with an EAS. For example, the ECS may provide configurations related to the EES and/or details of the EDN hosting the EES. Functionalities of an ECS may include provisioning of edge configuration information to the EEC. The edge configuration information may include the following: 1) the information for the EEC to connect to the EES (e.g., service area information applicable to a local area data network (LADN), e.g., for video services); and 2) the information for establishing a connection with EES (e.g., such as a universal resource identifier (URI), e.g., associated with a website).

The UE may contain any number of AC(s) and/or EEC(s). For example, one EEC may support one or more AC(s). Functionalities of EEC may include are: a) retrieval and provisioning of configuration information to enable the exchange of application data traffic with the EAS; and b) discovery of EAS(s) available to the UE (e.g., or one or more AC of the UE). An EEC may be identified by an EEC identifier (ID). An EEC ID may be a globally unique value that identifies the EEC. An EEC ID may be allocated by any of various authorities, like GSMA, ITU, 3GPP, and/or manufacturers, etc. An EES may store all the EEC IDs under its control and may deliver one of those EEC IDs to any EEC during the registration procedure in the application layer. One or more EEC(s) may be located in one UE.

Similarly, one ECS may support one or more EES and/or EDN. One EES may support one or more EAS, e.g., associated with one or more application. The EAS(s), the EES(s), and the ECS(s) may interact with a network such as a 3GPP core network.

As shown, the various entities may be connected by various edge interfaces (e.g., EDGE-1, EDGE-2, etc.). Different EESs may be connected by one or more EDGE-9 interfaces.

An edge server such as an ECS and/or EES may include one or more network interface operably coupled to one or more processors, according to some embodiments. The one or more processor(s) may be configured to cause the server to perform authentication according to the methods discussed herein, e.g., according to the methods of FIG. 6, as discussed below.

Figure 6:
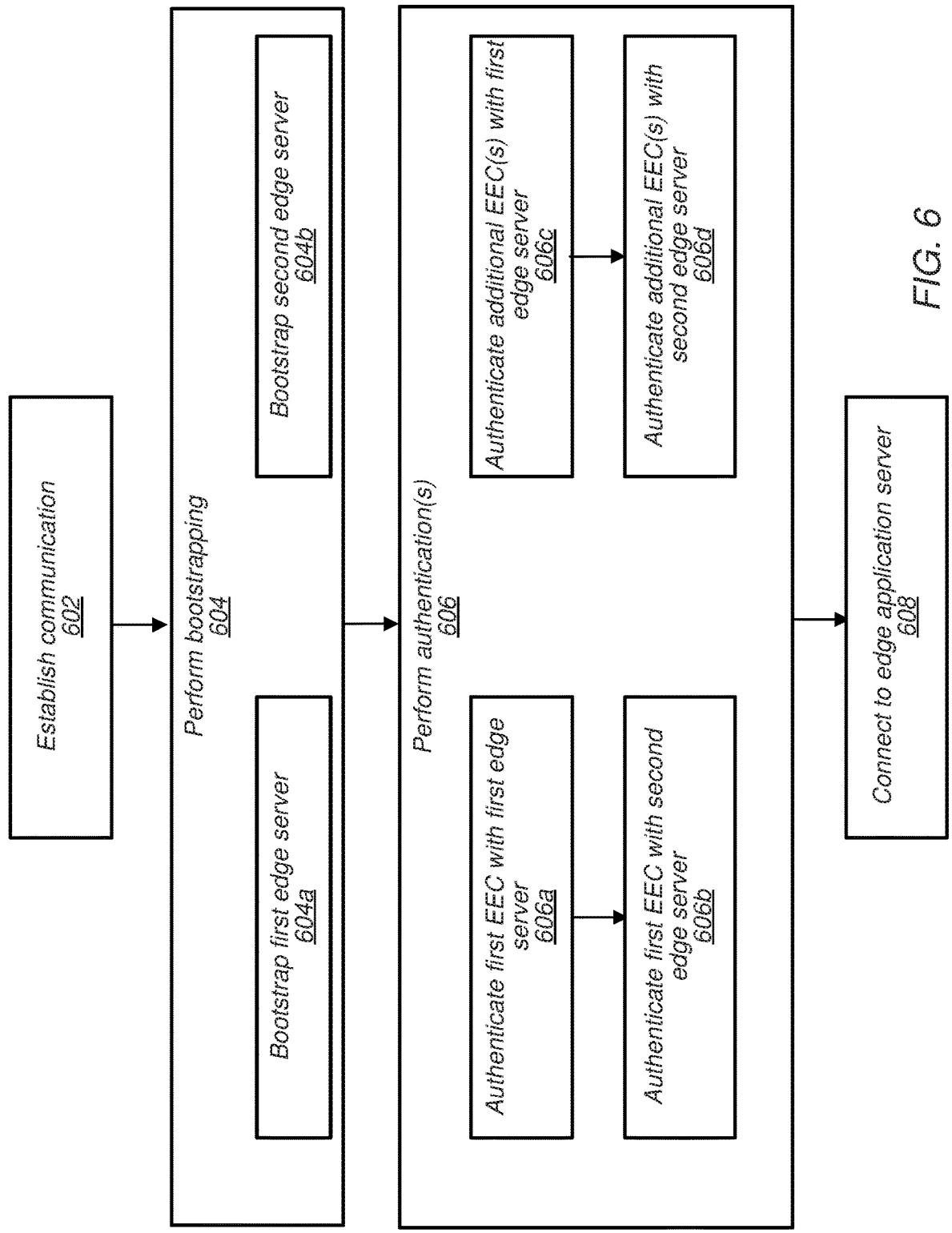
FIG. 6 is a flow diagram illustrating an example method for authentication in relation to edge computing servers, according to some embodiments.

FIG. 6—Authentication Between UEs and Edge Servers

A bootstrapping server function (BSF) may be an intermediary network element (e.g., in a 3GPP core network) which may provide application-independent functions for mutual authentication of user equipment and servers unknown to each other and for 'bootstrapping' the exchange of secret session keys at the conclusion of an authentication procedure. The shared secret may be used between network application functions (NAFs) and UEs, for example, for authentication purposes. Various bootstrapping techniques, such as generic authentication architecture (GAA) and/or generic bootstrapping architecture (GBA), may support the use of services which utilize authentication and secured communication.

In some embodiments, bootstrapping (e.g., GBA) may be performed on a per UE basis. As a result, one UE only has one key (e.g., Ks_NAF) with the NAF. However, there may be more than one EEC in one UE, so when GBA is used for the authentication for an EEC, some adaptation may be appropriate to achieve the authentication of different EECs.

FIG. 6 is a flow chart diagram illustrating an example method for authentication, according to some embodiments. The method of FIG. 6 may allow for authentication between UEs (e.g., with one or more ECC per UE) and edge computing servers (e.g., ECS and/or EAS, etc., e.g., which may be viewed as NAFs). For example, authentication between EEC and ECS/EAS may be performed based in part on GBA and may include combining the EEC ID with a key (e.g., similar to KNAF) derived in GBA, according to some embodiments.

In various embodiments, some of the elements of the methods shown in FIG. 6 may be performed concurrently, in a different order than shown, may be substituted for by other method elements, or may be omitted. For example, 604b, 606c, and/or 606d may be omitted according to some embodiments. One possible order may be: 602, 604a, 606a, 604b, 606b, 606c, 606d, 608. Another possible order may be: 602, 604a, 604b, 606a, 606b, 606c, 606d, 608. Another possible order may be: 602, 604a, 606a, 606c, 606b, 606d, 608. It will be appreciated that other orders and combinations are possible. Additional method elements may also be performed as desired.

Aspects of the method of FIG. 6 may be implemented by a UE, such as the UEs 106 or 107, a cellular network, and/or one or more edge computing server (such as an ECS and/or EES, among various possibilities), e.g., as illustrated in and described with respect to the Figures, or more generally in conjunction with any of the computer systems, circuitry, elements, components or devices shown in the Figures, among other devices, as desired. For example, one or more processors (or processing elements) (e.g., processor(s) 302, 404, baseband processor(s), processor(s) associated with communication circuitry such as 330, 332, 334, 336, 430, or 432, processors associated with various core network elements and/or edge servers, etc., among various possibilities) may cause a UE, network element, edge server (e.g., ECS, EES, etc.) and/or BS to perform some or all of the illustrated method elements. Note that while at least some elements of the method of FIG. 6 are described in a manner relating to the use of communication techniques and/or features associated with RFC, LTE, NR, and/or 3GPP specification documents, such description is not intended to be limiting to the disclosure, and aspects of the method of FIG. 6 may be used in any suitable wireless communication system, as desired. Similarly, while some elements of the method of FIG. 6 are described with respect to GBA, it will be appreciated that additional and/or different bootstrapping approaches may be used as desired. For example, AKMA, SSC, other GAA approaches, and/or other AKA approaches may be substituted for GBA, according to some embodiments. As shown, the method may operate as follows.

The UE and the network may establish communication (602), e.g., via a BS, according to some embodiments. The UE and the network may perform a primary authentication for the UE. For example, the network may provide the UE with an IP multimedia private identity (TMPI) and/or temporary IMPI (TMPI).

The UE and the BS may communicate using one or more radio access technologies (RATs), e.g., including NR. The UE and the BS may communicate using any frequency resources. The UE and the BS may communicate using one or more frequency carriers, e.g., including licensed and/or unlicensed carriers. The BS may provide one or more cell and/or cell groups and the communication between the UE and the BS may use one or more cell and/or cell group.

The network may exchange configuration information with the UE. For example, the BS may use radio resource control (RRC) and/or other higher layer signaling to negotiate parameters with the UE and/or to configure the UE. Among various possibilities, the configuration information may include information related to an ECS and/or other edge servers or networks. For example, the configuration information may include an address for an ECS.

The UE may perform bootstrapping with one or more edge server (604), according to some embodiments. The bootstrapping procedure(s) performed may include and/or be based on generic bootstrapping architecture (GBA), e.g., with the edge server acting as an NAF. The UE may perform bootstrapping with one or more edge servers, e.g., including an ECS 509 and/or EES 505, among various possibilities. The UE may use a TMPI and/or IMPI as a username for the bootstrapping procedure(s).

As one possibility, the UE may bootstrap with a first edge server (604a), according to some embodiments. The first edge server may be an ECS 509. To perform the bootstrapping procedure, the UE may exchange various messages with various network elements, e.g., a BSF. Following the bootstrapping procedure, the UE may have a preliminary key (e.g., Ks) which the UE can use to generate a first key associated with the first edge server (e.g., Ks_NAF). In the case that the first edge server is an ECS 509, the first key may be referred to as $K_{ECS0}$, among various possibilities. The first key may be useable for the UE to authenticate one or more EECs of the UE with the first edge server.

As a further possibility, the UE may bootstrap with a second edge server (604b), according to some embodiments. The second edge server may be an EES 505. To perform the bootstrapping procedure, the UE may exchange various messages with various network elements, e.g., a BSF. Following the bootstrapping procedure, the UE may have a second preliminary key (e.g., a second Ks) which the UE can use to generate a second key associated with the second edge server (e.g., a second Ks_NAF). In the case that the second edge server is an EES 505, the second key may be referred to as $K_{EES0}$, among various possibilities. The second key may be useable for the UE to authenticate one or more EECs of the UE with the second edge server.

The UE and the first and/or second edge server(s) may authenticate one or more EECs (606), according to some embodiments. The first and/or second edge server(s) may communicate with the BSF and/or other relevant network element(s) to retrieve the corresponding preliminary key (e.g., Ks) and then may use the corresponding preliminary key to generate the corresponding key (e.g., Ks_NAF, e.g., $K_{ECS0}$ or $K_{EES0}$).

To authenticate an EEC with a particular edge server (e.g., the first or the second edge server), the UE and the server may generate a new identifier and exchange messages to verify the identifier.

The UE (e.g., at the EEC) may generate a key that is specific to the EEC and the server. The EEC-specific key may be based on the corresponding key for the server (e.g., which is not specific to the UE). For example, the for an ECS (e.g., in 606a and/or 606c), the key (e.g., $K_{ECS1}$) may be based on $K_{ECS0}$ and the identifier of the EEC (e.g., EEC ID). Similarly, for an EES (e.g., in 606b and/or 606d), the key (e.g., $K_{EES1}$) may be based on $K_{EES0}$ and the identifier of the EEC (e.g., EEC ID). It will be appreciated that any number of EECs may generate specific keys. For example, EEC 1 may generate $K_{ECS1}$ (e.g., in 606a), EEC 2 may generate $K_{ECS2}$ (e.g., in 606c), etc.

The UE may further generate a message authentication code (MAC) (e.g., or a similar code/key useable for integrity protection verification) that is unique to the EEC and the particular edge server. The MAC may be calculated based on the identifier (ID) of the EEC (e.g., EEC ID) and the corresponding key for the server (e.g., Ks_NAF, e.g., $K_{ECS0}$ or $K_{EES0}$). The EEC ID and key may be combined as the parameter used to form the input S to the secure hash algorithm (SHA)-256 hashing algorithm. For example, the input parameter may be based on the concatenation of the key and the EEC ID. In other words, if P0=key and P1=EEC ID, then the input S may be equal to the concatenation P0||P1 of the P0 and P1. The MAC may be the N least significant bits of the output of the SHA-256 function. N could be 32 or 64 bits, among various possibilities. Other N values may be used as desired. For example, a MAC for EEC 1 for use with an ECS may be $MAC_{ECS1}$ and a MAC for EEC 3 for use with an EES may be $MAC_{EES3}$, etc. Other hashing algorithms may be used as desired.

In some embodiments, the MAC for a second edge server (e.g., an EES in 606b and/or 606d) may be generated based on the EEC ID and a key provided by a first edge server (e.g., an ECS). In other words, the first edge server may provide a key to the UE, and the key may be used as P0 to generate the MAC; P1 may be the EEC ID.

The UE may send a message to the particular edge server. The message may include the EEC ID and the MAC. The message may be an application registration request, among various possibilities.

In some embodiments, a message to a second edge server may further include a token provided by a first edge server, e.g., to the UE and to the second edge server. For example, an ECS may provide a token to the UE upon verifying the EEC (e.g., in 606a and/or 606c). When sending the message to an EES about the EEC (e.g., in 606b and/or 606d), the UE may include the token.

In response to receiving the message, the particular edge server may attempt to verify the MAC. In order to verify the MAC, the edge server may retrieve the corresponding key for the UE (e.g., Ks_NAF, e.g., $K_{ECS0}$ or $K_{EES0}$). The edge server may generate the key that is specific to the EEC and the server based on the corresponding key and the EEC ID that is included in the message. For example, an ECS may use $K_{ECS0}$ (e.g., retrieved from a BSF) and EEC 2 (e.g., received in the message from the UE/EEC 2) to generate the key $K_{ECS2}$. Based on the EEC-specific key and the EEC ID, the particular edge server may generate the MAC. If the MAC generated by the particular edge server matches the MAC in the message from the UE, the particular edge server may verify the MAC.

In some embodiments, the particular edge server may have previously received the key (e.g., as part of the bootstrapping procedure).

In response to verifying the MAC, the particular edge server may transmit a message to the UE. The message may indicate that the EEC is successfully verified.

In some embodiments, the message to the UE from a first edge server may include information about a second edge server. For example, an ECS (e.g., as a first server) may provide information about an EES ("EES information" or "edge configuration information"). The information may include information for the EEC to connect to the EES (e.g., identification of an EDN service area) and/or information for establishing a connection with the EES(s), such as URI.

In some embodiments, the message to the UE from a second edge server may be further in response to confirming that a token included in a message from the UE matches a token received (e.g., by the second edge server) from the first edge server.

In some embodiments, if the MAC (and/or the token) is not verified, the particular edge server may not continue the verification process. For example, the server may not transmit a message to the UE or may transmit a message indicating that verification was not successful. In response, the UE may restart the verification process.

For an individual EEC, the first edge server may be authenticated and then the second edge server may be authenticated (e.g., 606a then 606b; 606c then 606d). However, for multiple EECs, the authentications of different EECs can be performed in any order. For example, the UE may authenticate multiple EECs with the first edge server (e.g., 606a may occur and 606c may occur for any number of additional EECs) and then may authenticate some or all of the multiple EECs with the second edge server (e.g., 606b and 606d). Alternatively, the UE may authenticate one EEC with the first edge server (606a) and then authenticate the EEC with the second edge server (606b) before authenticating a second EEC with the first edge server (606c). Various other orders may be used.

The UE (e.g., an application client (AC) 501 corresponding to a particular EEC 507) may connect to a third edge server, e.g., an edge application server (EAS) 503 (608), according to some embodiments. The UE (e.g., EEC and/or AC) may complete a verification process with the EAS. The UE (e.g., AC) and the EAS may exchange application data for the application.

The UE may connect to different EASs for different EECs/ACs. For example, different applications may complete verification processes and/or exchange data with different EASs. The UE may connect any number of ACs with any number of EASs. One or more EECs and corresponding ACs may complete the verification process before one or more other EECs complete the authentication processes (e.g., in 606c/606d).

Figure 7:
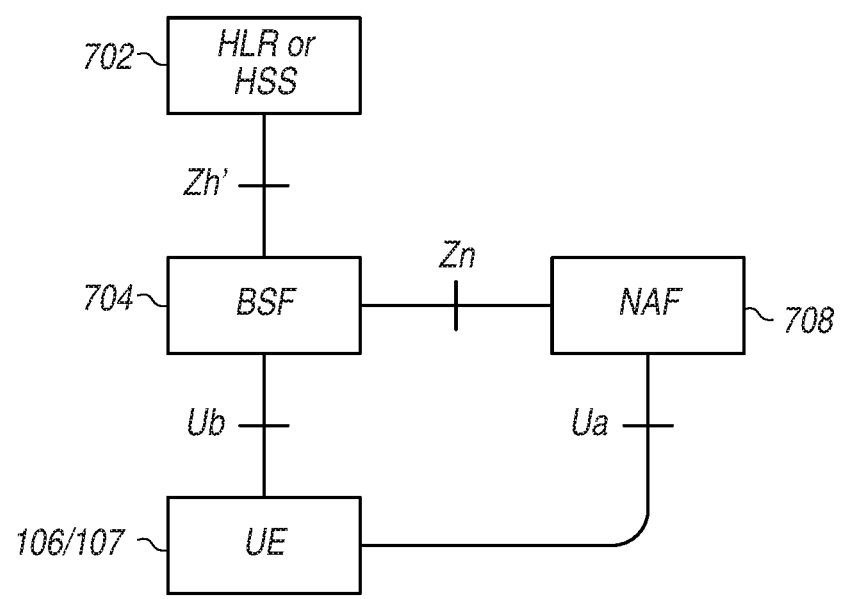
FIGS. 7-11 illustrate aspects of performing authentication, according to some embodiments.
Figure 8:
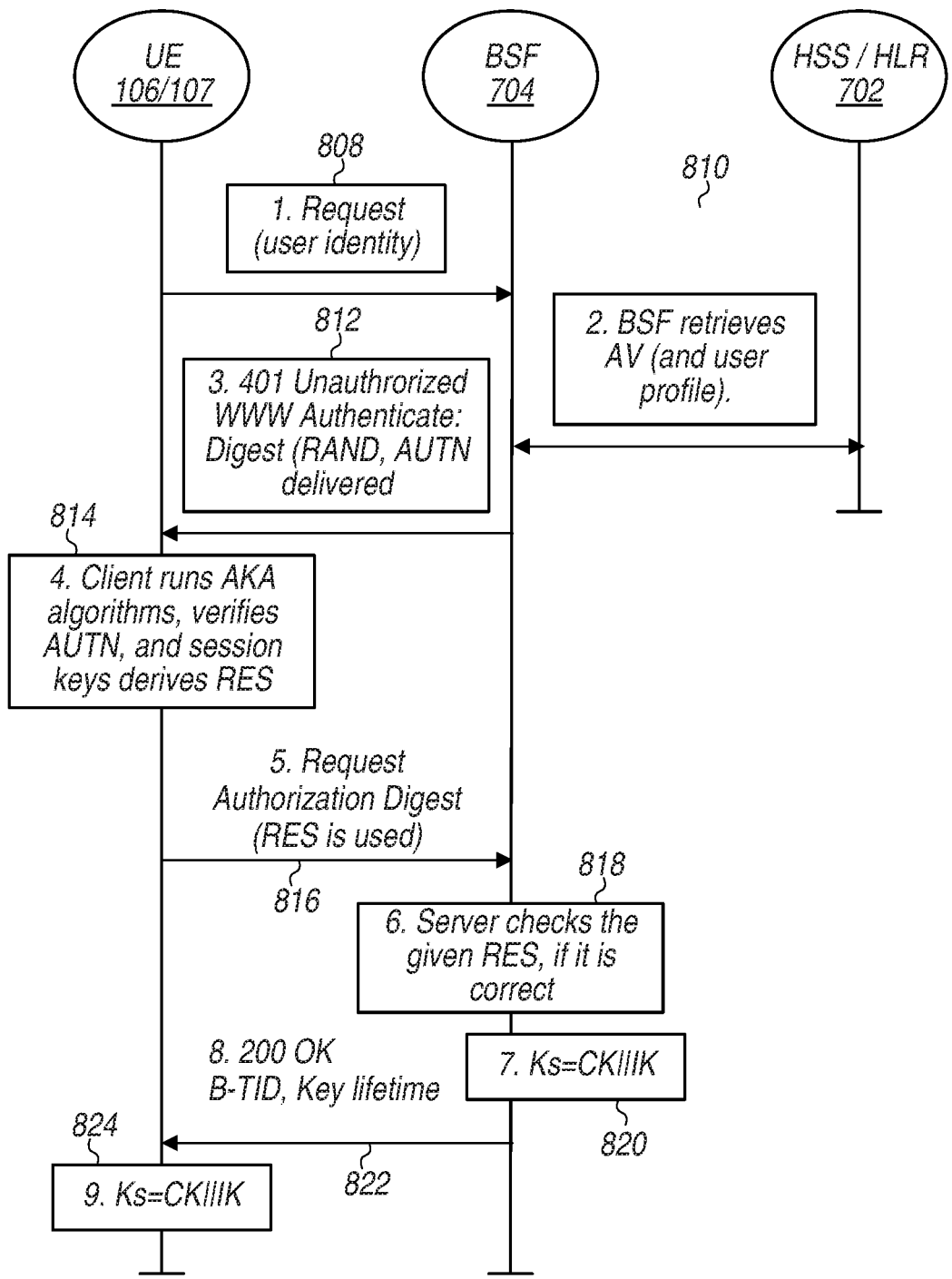

FIGS. 7-8—Generic Bootstrapping Architecture (GBA)

FIGS. 7 and 8 illustrate aspects of GBA, according to some embodiments.

FIG. 7 illustrates a network model for bootstrapping procedures such as GBA. GBA may be applicable if a UE is associated with a valid identity on an HLR (Home Location Register) and/or on an HSS (Home Subscriber Server) 702, among various possibilities. The HLR/HSS may communicate with the BSF 704 over the Zh' interface. The BSF may communicate with a UE 106/107 (e.g., to perform GBA) over a Ub interface. The UE also communicates with the Network Application Function (NAF) 708, over the Ua interface. The NAF(s) may be implementation servers, which can use any specific application protocol necessary. As discussed herein, edge computing servers (e.g., ECS 509 and/or EES 505) may be examples of NAF.

FIG. 8 illustrates a bootstrapping authentication process, e.g., GBA according to some embodiments. Authentication and key agreement (AKA) may be a security protocol. GBA may be based on AKA. After a GBA procedure a UE and NAF may share a secret key (e.g., Ks_NAF, $K_{ECS0}$, $K_{EES0}$, etc.).

When a UE wants to interact with a NAF, and it knows that the bootstrapping procedure is needed, it may perform a bootstrapping authentication. Various steps may be related to the specifications of the AKA protocol in TS 33.102 and the HTTP digest AKA protocol in RFC 3310.AKA may also be used for one-time password generation mechanism for digest access authentication. AKA may be a challenge-response based mechanism that uses symmetric cryptography.

As shown, the procedure may operate as follows. The UE may transmit a request to the BSF (808), according to some embodiments. The UE may include its TMPI, IMPI, and/or other identifier in the request, e.g., in a "username" parameter.

The BSF may receive the request and may recognize the structure of the "username" parameter, e.g., to determine the type of identifier sent. If a TMPI is included in the request, the BSF may determine the corresponding IMPI using a local database. If no IMPI is found, the BSF may return an error.

If the IMPI is found or is included in the request, the BSF may proceed to retrieve the authentication vector (AV) (810), according to some embodiments. The BSF may retrieve the AV from the HSS and/or HLR, among various possibilities. The BSF may further retrieve user profile information, according to some embodiments. If the BSF does not have the address of the HSS and/or HLR, the BSF may retrieve the address prior to retrieving the AV. The AV may be a concatenation of various parameters, e.g., AV=RAND∥AUTN∥XRES∥CK∥IK.

The BSF may instruct the UE to authenticate itself (812), according to some embodiments. The instruction may be in a 401 message and may include a subset of the AV. For example, the instruction may include the RAND and AUTN (e.g., without the CK, IK and XRES).

The UE may receive and verify that the challenge (e.g., instruction) is from an authorized network (814), e.g., based on the AUTN. The UE may also calculate the CK, IK and RES. CK and IK may be session keys and may be shared by the BSF and the UE.

The UE may send another (e.g., HTTP) request to the BSF (816), according to some embodiments. This request may be a digest AKA response to the challenge and may be calculated based on the RES.

The BSF may check that the RES is correct, and if so, verify the digest AKA response and authenticate the UE (818), according to some embodiments.

The BSF may generate a key (e.g., Ks), based on the concatenation of the session keys (e.g., CK and IK) (820), according to some embodiments. The BSF may also generate a B-TID value in format of NAI, e.g., based on the RAND value from step 3, and the BSF server name. The BSF may also generate a new TMPI for the UE.

The BSF may send a message to the UE (822), e.g., indicating that the authentication is successful. The message may be a 200 OK message and may include the B-TID. The BSF may also indicate the lifetime of the key (e.g., Ks).

The UE may determine Ks (824), according to some embodiments.

Both the UE and the BSF may use the preliminary key Ks to derive the key (e.g., Ks_NAF, $K_{ECS0}$, and/or $K_{EES0}$) The key may be derived as specified in clause 4.5.3 of TS 33.220 and may be used for securing the reference point Ua.

In some embodiments, the key (e.g., Ks_NAF, $K_{ECS0}$, and/or $K_{EES0}$) may be computed as key=KDF (Ks, "gba-me", RAND, IMPI, NAF Id), where KDF is the key derivation function as specified in Annex B of TS 33.220, and the key derivation parameters consist of the IMPI, an ID of the NAF (e.g., EES, ECS, etc.) and RAND. The ID of the NAF may be constructed as follows: ID=FQDN of the NAF∥Ua security protocol identifier. The Ua security protocol identifier may be specified in Annex H of TS 33.220.

In some embodiments, the BSF may transmit the preliminary key and/or related information (e.g., B-TID, and/or TMPI) to the NAF (e.g., ECS, EES). For example, the BSF may provide Ks to the NAF allowing the NAF to determine Ks_NAF, $K_{ECS0}$, and/or $K_{EES0}$ Thus, the NAF may have Ks_NAF, $K_{ECS0}$, and/or $K_{EES0}$ following the bootstrapping procedure. The NAF may be able to use this information to verify information transmitted by the UE and/or to authenticate the UE or one or more EEC(s) of the UE.

It will be appreciated that a GBA procedure in which the ECS or EES is the NAF may be referred to as a GBA procedure with the ECS or EES, respectively, among various possibilities.

Figure 9:
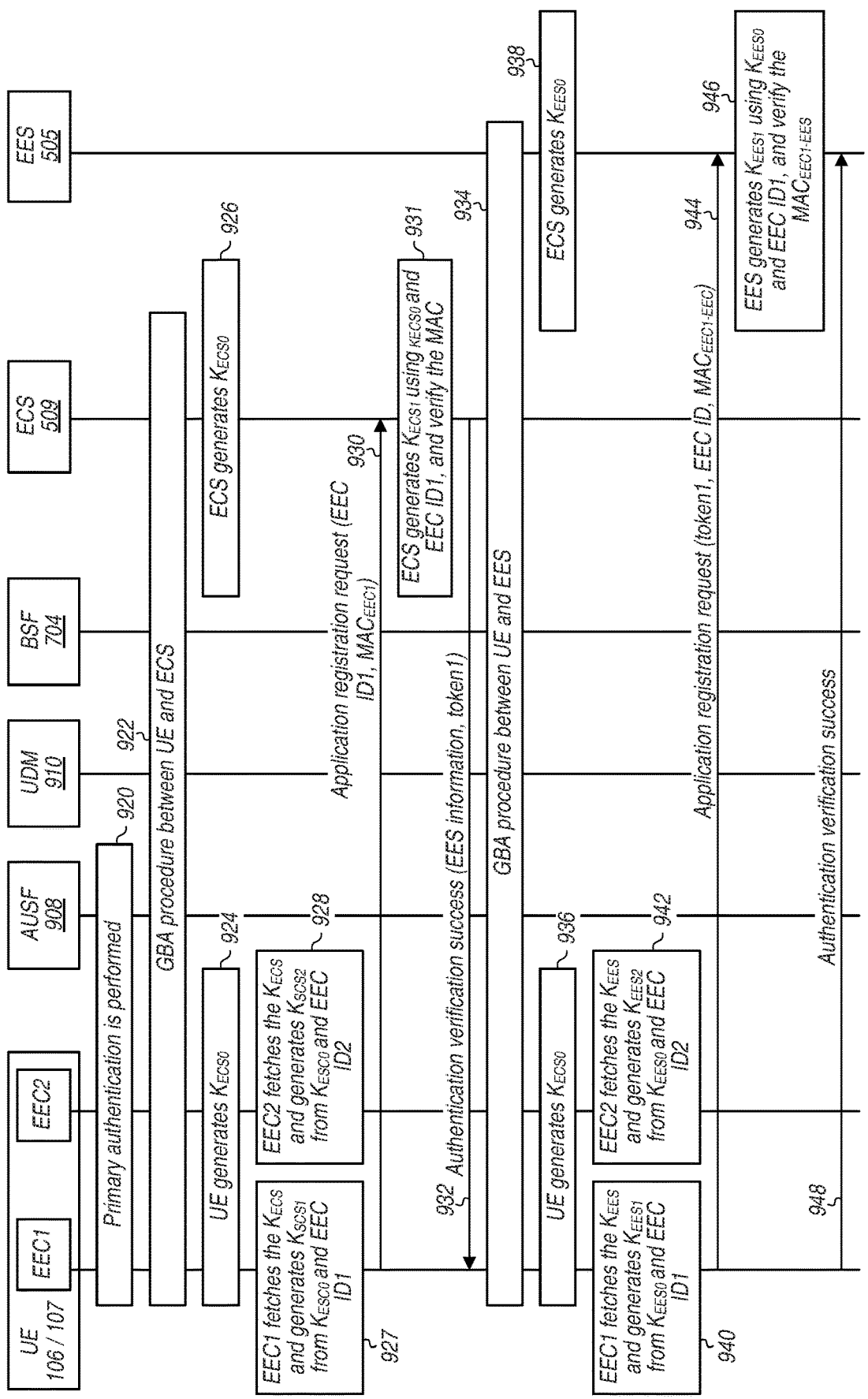

FIG. 9—Authentication Using Two GBA Procedures

FIG. 9 illustrates an example of performing authentication of one or more EECs using two GBA procedures, according to some embodiments. It will be appreciated that FIG. 9 is one example of the methods of FIG. 6 and that other examples are possible. Additional method elements may be added or substituted. Method elements may be omitted, performed concurrently, and/or performed in a different order than shown.

An authentication Server Function (AUSF) 908 may support authentication for 3GPP access as specified in 3GPP TS 33.501. A unified data manager function (UDM) 910 may support generation of 3GPP 5G AKA authentication vectors (AVs).

As shown, the method may proceed as follows.

The UE may perform primary authentication with the network (920), according to some embodiments. The UE may receive a TMPI from the AUSF.

The UE and ECS may perform GBA (922), according to some embodiments. The GBA may use procedures of TS 33.220, e.g., with the ECS acting as a NAF.

The UE and the ECS may (e.g., independently) generate $K_{ECS0}$ after performing GBA (924, 926, respectively). $K_{ECS0}$ may be similar to Ks_NAF in GBA.

A first EEC (e.g., EEC1) of the UE may fetch the $K_{ECS0}$ (e.g., from a functionality in the UE that may perform the GBA) and may generate an EEC-specific key (e.g., $K_{ECS1}$) from $K_{ECS0}$ and EEC ID1 (927), according to some embodiments.

A second EEC (e.g., EEC2) may similarly fetch the $K_{ECS0}$ and may generate an EEC-specific key (e.g., $K_{ECS2}$) from $K_{ECS0}$ and EEC ID2 (928), according to some embodiments. It will be appreciated that 928 may occur concurrently with 927 or at a later time.

NOTE: For some other steps (e.g., 930, 931, 932, 944, 946, and 948) the actions are only shown for EEC1 for ease of illustration. However, it will be appreciated that a second EEC (and/or any number of other additional EECs) may take parallel steps as those illustrated and described for EEC1.

The UE may send a message (e.g., an application registration request) to the ECS (930), according to some embodiments. The message may include the EEC ID and a corresponding MAC. The MAC may be calculated based on EEC ID and $K_{ECS0}$, e.g., using a hashing algorithm such as SHA-256.

The ECS may generate the EEC-specific key (e.g., $K_{ECS1}$, in the case of EEC1) using $K_{ECS0}$ and the EEC ID (931), according to some embodiments. The ECS may use the EEC-specific key to verify the MAC.

The ECS may send a response indicating authentication verification success back to the UE if the MAC verification succeeds (932), according to some embodiments. The response may include EES information and/or a first token (e.g., token1). It will be appreciated that different EES information and/or different tokens may be provided to the UE for different EECs. For example, a response verifying a MAC of EEC 2 may include EES information describing a different EES. In some embodiments, the token may be useable for the UE to demonstrate, to the EES, that the UE has been authenticated by the ECS.

In some embodiments, the ECS may further transmit an indication to the EES of the successful verification and may provide relevant information. For example, the ECS may also provide the first token (e.g., or information of/about the token) to the EES and/or may provide information about the UE and/or EEC(s) verified, such as ID information.

If the MAC is not verified, the procedure may be stopped by the ECS. For example, the ECS may not send a response or may send a response indicating the verification failure.

The UE and ECS perform a second GBA (934), according to some embodiments. The GBA may be performed following TS 33.220. The ECS may act as the NAF in this case. The UE may use the EES information (e.g., provided by the ECS) to determine the address of the EES and/or use the information to determine how to contact the EES and/or initiate the GBA.

In some embodiments, the GBA may be performed any time after at least one EEC of the UE is verified by the ECS. In some embodiments, the GBA may be performed prior to any EEC of the UE being verified by the ECS. For example, the GBA with the EES may be concurrent with or prior to the GBA with the ECS.

The UE and the EES may (e.g., independently) generate $K_{EES0}$ after performing GBA (936, 938, respectively). $K_{ECS0}$ may be similar to Ks_NAF in GBA.

A first EEC (e.g., EEC1) of the UE may fetch the $K_{EES0}$ (e.g., from a memory, e.g., associated with a baseband processor or cellular modem of the UE that may perform the GBA) and may generate an EEC-specific key (e.g., $K_{EES1}$) from $K_{EES0}$ and EEC ID1 (940), according to some embodiments.

A second EEC (e.g., EEC2) may similarly fetch the $K_{EES0}$ and may generate an EEC-specific key (e.g., $K_{EES2}$) from $K_{EES0}$ and EEC ID2 (942), according to some embodiments. It will be appreciated that 942 may occur concurrently with, prior to, or subsequently to 940.

The UE may send a message (e.g., application registration request) to the EES (944), according to some embodiments. The message may include information such as any token (e.g., token1) received from the ECS, the EEC ID, and a MAC. The MAC may be calculated based on the EEC ID and $K_{EES0}$.

The EES may generate the EEC-specific key using $K_{EES0}$ and the EEC ID (946), according to some embodiments. The EES may verify the MAC and/or the information (e.g., token1).

The EES may send may send a response indicating authentication verification success back to the UE if the MAC and/or information verification succeeds (948), according to some embodiments. Otherwise, the EES may stop the procedure.

In some embodiments, the UE may perform only one GBA procedure with each server, e.g., one GBA with the ECS and one GBA with the EES. This may be true regardless of whether more than one EEC is active on the UE. In other words, the UE may not perform any additional GBA(s) with each server based on having more than one EEC active on the UE.

Figure 10:
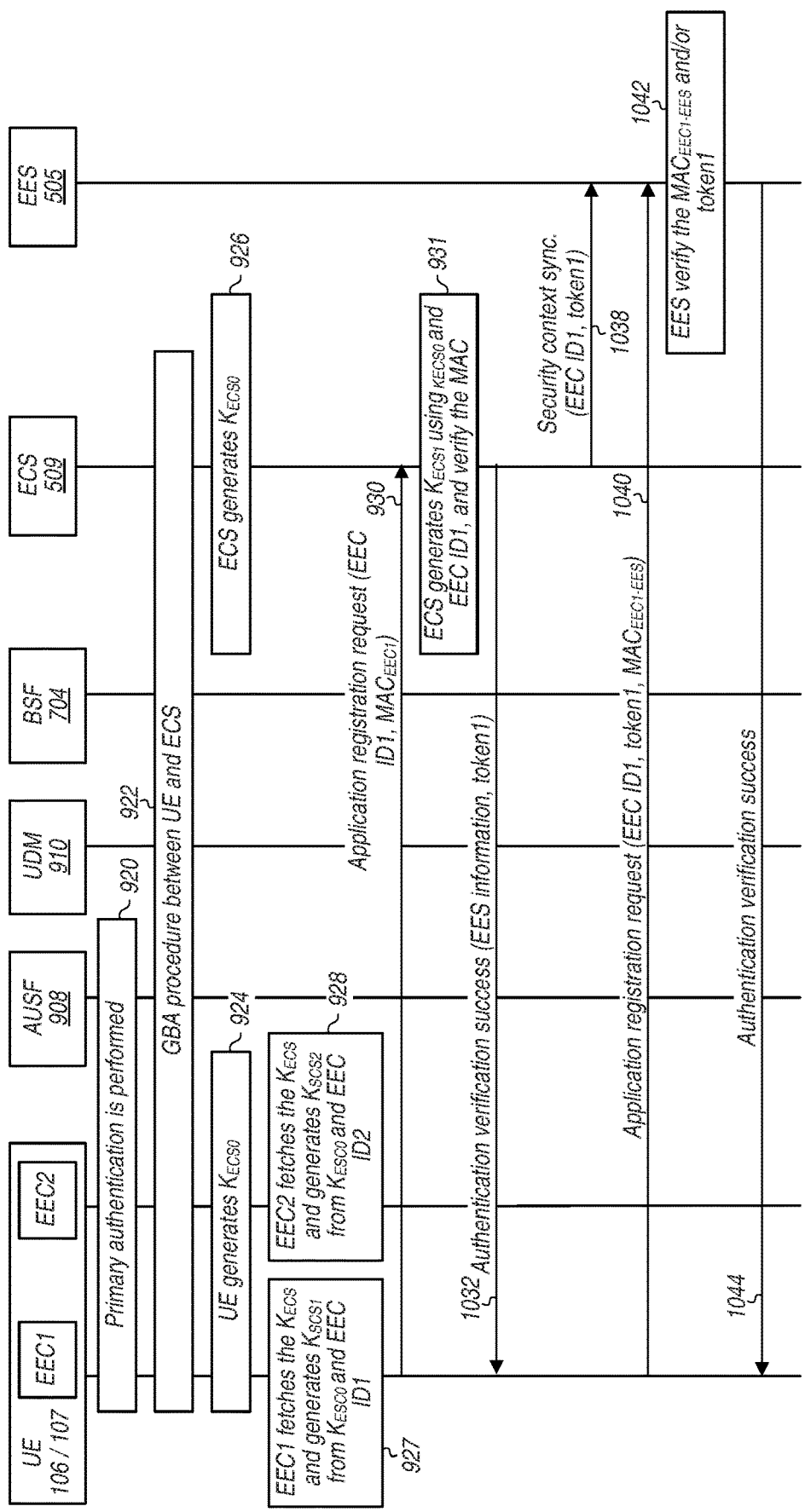

FIG. 10—Authentication Using a Single GBA Procedure

FIG. 10 illustrates an example of performing authentication of one or more EECs using a single GBA procedures, according to some embodiments. It will be appreciated that FIG. 10 is one example of the methods of FIG. 6 and that other examples are possible. Additional method elements may be added or substituted. Method elements may be omitted, performed concurrently, and/or performed in a different order than shown.

As shown, the method may proceed as follows.

The UE may perform primary authentication with the network (920), according to some embodiments. The UE may receive a TMPI from the AUSF.

The UE and ECS may perform GBA (922), according to some embodiments. The GBA may use procedures of TS 33.220, e.g., with the ECS acting as a NAF.

The UE and the ECS may (e.g., independently) generate $K_{ECS0}$ after performing GBA (924, 926, respectively). $K_{ECS0}$ may be similar to Ks_NAF in GBA.

A first EEC (e.g., EEC1) of the UE may fetch the $K_{ECS0}$ (e.g., from a memory, e.g., associated with a baseband processor or cellular modem of the UE that may perform the GBA) and may generate an EEC-specific key (e.g., $K_{ECS1}$) from $K_{ECS0}$ and EEC ID1 (927), according to some embodiments.

A second EEC (e.g., EEC2) may similarly fetch the $K_{ECS0}$ and may generate an EEC-specific key (e.g., $K_{ECS2}$) from $K_{ECS0}$ and EEC ID2 (928), according to some embodiments. It will be appreciated that 928 may occur concurrently with 927 or at a later time.

NOTE: For some other steps (e.g., 930, 931, 1032, 1038, 1040, and 1042) the actions are only shown for EEC1 for ease of illustration. However, it will be appreciated that a second EEC (and/or any number of other additional EECs) may take parallel steps as those illustrated and described for EEC1.

The UE may send a message (e.g., an application registration request) to the ECS (930), according to some embodiments. The message may include the EEC ID and a MAC such as a MAC ID. The MAC may be calculated based on EEC ID and $K_{ECS0}$, e.g., using a hashing algorithm such as SHA-256.

The ECS may generate the EEC-specific key (e.g., $K_{ECS1}$, in the case of EEC1) using $K_{ECS0}$ and the EEC ID (931), according to some embodiments. The ECS may use the EEC-specific key to verify the MAC.

The ECS may send a response indicating authentication verification success back to the UE if the MAC verification succeeds (1032), according to some embodiments. The response may include EES information and/or a first token (e.g., token1). It will be appreciated that different EES information and/or different tokens may be provided to the UE for different EECs. For example, a response verifying a MAC of EEC 2 may include a different token, (e.g., token 2) and/or EES information describing a different EES.

In some embodiments, no token may be provided to the UE.

The ECS may send information to one or more EES (1038), according to some embodiments. The information may include security context information, e.g., related to the verified EEC. The information may be sent in response to verification of the MAC. For example, in response to successfully verifying a MAC, the ECS may send the EEC ID, corresponding token, and/or $K_{ECS0}$ to the EES. It will be appreciated that, in the case that different EECs correspond to different EESs, the ECS may send the corresponding EEC IDs, keys, and/or tokens to the different EESs. 1038 may occur before, after, or concurrently with 1032.

The UE may send a message (e.g., an application registration request) to the EES (1040), according to some embodiments. The message may include an EEC identifier, token (e.g., token1), and/or a MAC. The MAC may be specific to the EES and may be based on the EEC ID. For example, the MAC may be determined based on the EEC ID and the key (e.g., $K_{ECS0}$). For example, when deriving a MAC (e.g., $MAC_{EEC1-EES}$), the following parameters may be used to form the input S to the SHA-256 hashing algorithm: P0=key and P1=EEC ID. Thus, the input S may be equal to the concatenation P0‖P1 of the P0 and P1. The MAC may be identified with the N least significant bits of the output of the SHA-256 function. N may be 32 or 64 bits, among various possibilities. Other hashing algorithms may be used as desired. Note that, for generating the MAC, the UE may re-use the same key (e.g., $K_{ECS0}$) used with the ECS.

The EES may verify the MAC and/or token (1042), according to some embodiments. For example, the EES may independently generate the MAC using the key and EEC ID (e.g., received in 1038) and may determine whether the MAC received from the UE matches the MAC generated by the EES. The EES may further verify that the token received from the UE matches the token received from the ECS. For example, the token received from the UE matching the token received from the ECS may verify that the UE was authenticated by the ECS.

The EES may send a response to the UE indicating authentication verification success (1044), e.g., if the MAC and/or token is verified successfully, according to some embodiments. If the MAC is not verified (e.g., the received MAC does not match an independently generated MAC), the EES may stop the procedure and may or may not transmit a notification to the UE.

Figure 11:
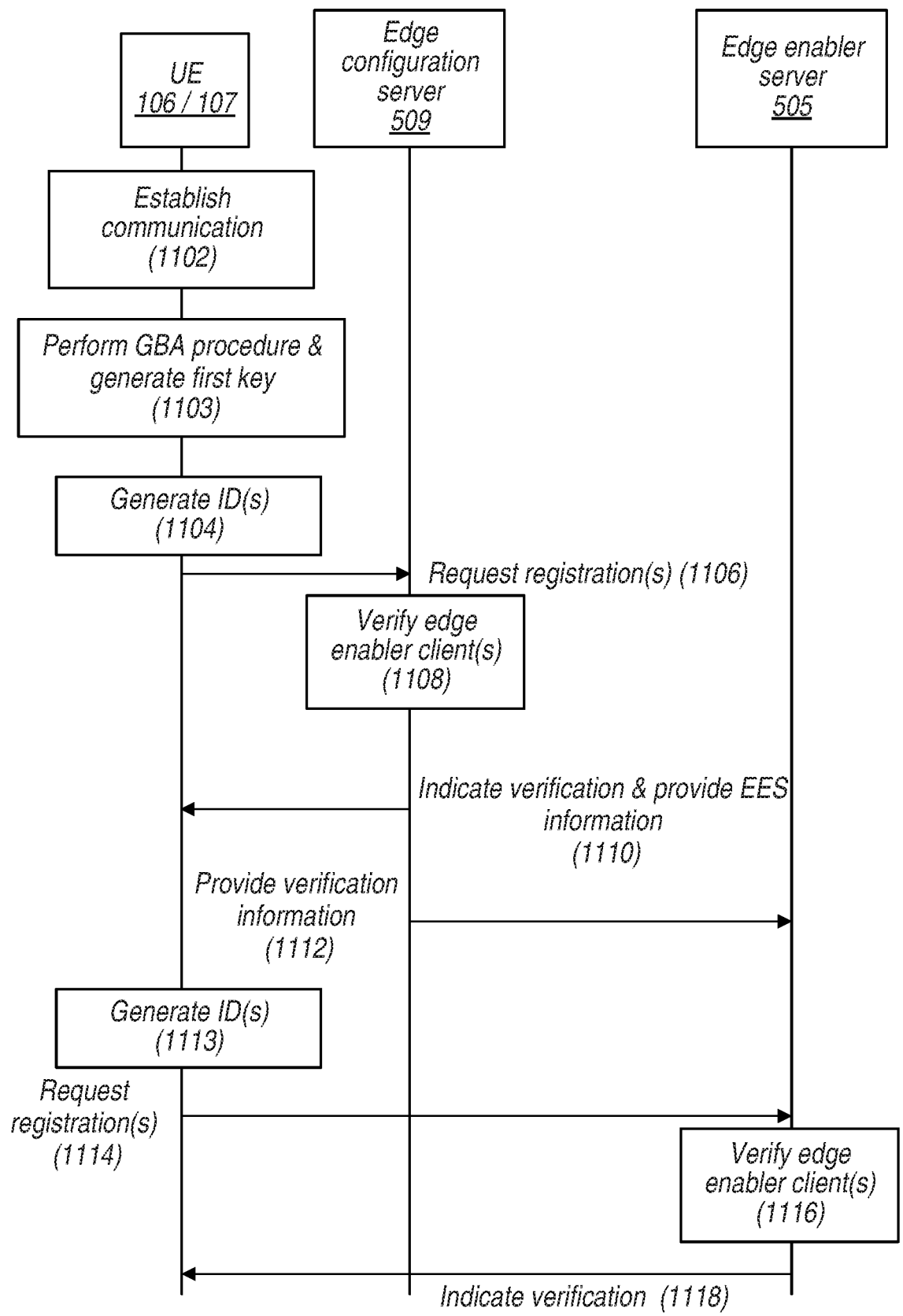

FIG. 11—Authentication Using One or More Bootstrapping Procedure

FIG. 11 illustrates an example of performing authentication of one or more EECs using one or more bootstrapping (e.g., GBA) procedures, according to some embodiments. It will be appreciated that FIG. 11 is one example of the methods of FIG. 6 and that other examples are possible. Additional method elements may be added or substituted. Method elements may be omitted, performed concurrently, and/or performed in a different order than shown. As shown, the method may proceed as follows.

A UE may establish communication with a cellular network (1102), according to some embodiments. The UE and the network may perform a primary authentication and the UE may receive a TMPI, IMPI, and/or other identifier.

The UE may perform a first bootstrapping procedure with a first edge server (e.g., an ECS) (1103), according to some embodiments. The UE and the first edge server may share a first key (e.g., $K_{ECS0}$).

The UE may generate an identifier for at least one EEC for use with the first edge server (1104), according to some embodiments. The UE may generate respective IDs for any number of EECs, e.g., based on $K_{ECS0}$ and the respective EEC IDs. Each EEC may have a unique ID for the first edge server. The ID(s) may be a MAC(s) such as a MAC ID(s) and may be generated using SHA-256 hashing. Other hashing algorithms may be used as desired.

The UE may request registration(s) for one or more EEC with the first edge server (e.g., ECS) (1106), according to some embodiments. The EECs may be registered at the same or different times. The respective registration request messages may include the respective IDs (e.g., MAC, e.g., MAC ID) generated based on the respective EEC IDs and the first key.

The first edge server may verify the one or more EECs (1108), according to some embodiments. For example, the first edge server may independently generate the MAC based on the EEC ID and the first key and may determine whether the independently generated MAC matches the received MAC.

If the verification of an EEC is unsuccessful (e.g., the MACs do not match), the first edge server may stop the authentication process.

If the verification of an EEC is successful, the first edge server may provide information to the UE (1110), according to some embodiments. The information may include information about a second edge server (e.g., EES) and/or a token for registration with the second edge server.

If the verification of an EEC is successful, the first edge server may provide information to the second edge server (e.g., EES) (1112), according to some embodiments. The information may include information about the UE and/or EEC (e.g., EEC ID, etc.) and/or the token.

The UE may perform a second bootstrapping (e.g., GBA) procedure with the second edge server, according to some embodiments. Following such a second bootstrapping procedure, the UE and the second edge server may share a second key (e.g., $K_{EES0}$). For example, the second bootstrapping may be performed in embodiments in which the UE may not receive a token from the first edge server. In other words, the second bootstrapping or the token may be used so that the UE and the second edge server share a second key or token. However, it may be the case that only one of the bootstrapping or token is used, according to some embodiments.

The UE may generate an identifier for at least one EEC for use with the second edge server (1113), according to some embodiments. The UE may generate respective IDs for any number of EECs, e.g., based on the shared key (e.g., $K_{EES0}$) or the token and the respective EEC IDs. Each EEC may have a unique ID for the second edge server. The ID(s) may be a MAC(s) and may be generated using SHA-256 hashing. Other hashing algorithms may be used as desired.

The UE may request registration(s) for one or more EEC with the second edge server (e.g., EES) (1114), according to some embodiments. The EECs may be registered at the same or different times. The respective registration request messages may include the respective IDs (e.g., MAC) generated based on the respective EEC IDs and the shared key or token.

The second edge server may verify the one or more EECs (1116), according to some embodiments. For example, the second edge server may independently generate the MAC based on the EEC ID and the shared key or token and may determine whether the independently generated MAC matches the received MAC.

If the verification of an EEC is unsuccessful (e.g., the MACs do not match), the second edge server may stop the authentication process.

If the verification of an EEC is successful, the second edge server may provide an indication of verification success to the UE (1118), according to some embodiments. The second edge server may further provide information to the UE. The information may include information about a third edge server (e.g., EAS) and/or information (such as a token) for registration with the third edge server, according to some embodiments.

Additional Information and Embodiments

In some embodiments, the UE may use a single message (e.g., application registration request) to register multiple EECs with an edge server (e.g., an ECS or EES). For example, the UE may include multiple EEC IDs and multiple MACs in a single message. In response, the server may attempt to verify the multiple EECs. The server may provide responses for the respective EECs in one or multiple messages.

In some embodiments, a method for an edge enablement server (EES) may comprise establishing communication with a bootstrapping server function (BSF). The EES may receive, from the BSF, a first key associated with a first user equipment (UE). The EES may establish communication with the UE and receive, from a first edge enabler client (EEC) of the UE, a first application registration request comprising: an authentication code of the first EEC; and a first authentication code. The EES may verify the first authentication code based on the first key and the authentication code of the first EEC, and, in response to successfully verifying the first authentication code, provide, to the UE, information about an edge application server.

In some embodiments, a method for an edge enablement server (EES) may comprise establishing communication with an edge configuration server (ECS). The EES may receive, from the ECS, a first token associated with a first user equipment (UE). The EES may establish communication with the UE and receive, from a first edge enabler client (EEC) of the UE, a first application registration request comprising: an authentication code of the first EEC; and a first authentication code. The EES may verify the first authentication code based on the first token and the authentication code of the first EEC, and, in response to successfully verifying the first authentication code, provide, to the UE, information about an edge application server.

In some embodiments, a method may comprise: at a user equipment (UE): performing a first bootstrapping procedure with a first edge server, the first bootstrapping procedure including generating a first key; generating a first authentication code for a first edge enabler client (EEC) operating at the UE, wherein the first authentication code is for use with the first edge server; transmitting a first registration request for the first EEC to the first edge server, the first registration request including the first authentication code; receiving, from the first edge server, a first registration success message comprising first information for authenticating with a second edge server; generating a second authentication code for the first EEC, wherein the second authentication code is for use with the second edge server; transmitting a second registration request for the first EEC to the second edge server, the second registration request including the second authentication code; receiving, from the second edge server, a second registration success message comprising second information for discovery of a third edge server; and discovering the third edge server using the second information.

In some embodiments, the first authentication code is based on the first key and an identifier of the first EEC.

In some embodiments, at least one of the first authentication code and the second authentication code is generated using a SHA-256 hashing algorithm In some embodiments, at least one of the first authentication code and the second authentication code comprises a message authentication code.

In some embodiments, the first edge server comprises an edge configuration server, the second edge server comprises an edge enabler server, and the third edge server comprises an edge application server.

In some embodiments, the method may further comprise exchanging application data of an application associated with the first EEC with the third edge server.

In some embodiments, the method may further comprise: establishing communication with a cellular network; performing a primary authentication with the cellular network, the primary authentication including receiving a UE identifier from the cellular network, wherein the UE identifier is one of an IP multimedia private identity (IMPI) or temporary IMPI (TMPI); and including the UE identifier as a username for the first bootstrapping procedure, wherein the first bootstrapping procedure comprises a generic bootstrapping architecture (GBA) procedure.

In some embodiments, the method may further comprise performing a second bootstrapping procedure with the second edge server using the first information for authenticating with the second edge server, the second bootstrapping procedure including generating a second key.

In some embodiments, the second authentication code (e.g., for the first EEC) is based on the second key and an identifier of the first EEC.

In some embodiments, the method may further comprise: generating a third authentication code for a second EEC operating at the UE, wherein the third authentication code is for use with the first edge server; transmitting a third registration request for the second EEC to the first edge server, the third registration request including the third authentication code; receiving, from the first edge server, a third registration success message comprising third information for authenticating with a fourth edge server; generating a fourth authentication code for the second EEC, wherein the fourth authentication code is for use with the fourth edge server; transmitting a fourth registration request for the second EEC to the fourth edge server, the fourth registration request including the fourth authentication code; and receiving, from the fourth edge server, a fourth registration success message.

In some embodiments, the fourth edge server is the same as the second edge server.

In some embodiments, the fourth edge server is different than the second edge server.

In some embodiments, the third authentication code is based on the first key and an identifier of the second EEC.

In some embodiments, the first information for authenticating with the second edge server comprises a first token.

In some embodiments, the second registration request further includes the first token.

In some embodiments, the second authentication code is based on the first key and an identifier of the first EEC.

In some embodiments, the first key is $K_{ECS0}$.

In some embodiments, the method may further comprise: generating a third authentication code for a second EEC operating at the UE, wherein the third authentication code is for use with the first edge server; transmitting a third registration request for the second EEC to the first edge server, the third registration request including the third authentication code; receiving, from the first edge server, a third registration success message comprising third information for authenticating with a fourth edge server; generating a fourth authentication code for the second EEC, wherein the fourth authentication code is for use with the fourth edge server; transmitting a fourth registration request for the second EEC to the fourth edge server, the fourth registration request including the fourth authentication code; and receiving, from the fourth edge server, a fourth registration success message.

In some embodiments, the third information for authenticating with the fourth edge server comprises a second token In some embodiments, the fourth identifier is based on the first key and an identifier of the second EEC.

In some embodiments, the fourth edge server is the same as the second edge server.

In some embodiments, the fourth edge server is different from the second edge server.

In some embodiments, an apparatus comprising a processor may be configured to cause a user equipment to perform a method according to any of the previous examples.

In some embodiments, a user equipment (UE) may comprise a radio and a processor configured to cause the UE to perform a method according to any of the previous examples.

In some embodiments, a method for operating an edge configuration server may comprise: establishing communication with a bootstrapping server function (BSF); receiving, from the BSF, a first key associated with a first user equipment (UE); establishing communication with the UE; receiving, from a first edge enabler client (EEC) of the UE, a first application registration request comprising: an identifier of the first EEC; and a first message authentication code (MAC); verifying the first MAC based on the first key and the identifier of the first EEC; and in response to successfully verifying the first MAC, providing, to the UE, information for authenticating an edge enablement server.

In some embodiments, the information for authenticating the edge enablement server comprises a token, the method further comprising providing the token to the edge enablement server.

In some embodiments, a computer program product, comprising computer instructions which, when executed by one or more processors, may perform steps of any of the methods described herein.

In various embodiments, various combinations of the embodiments described above may be combined together.

Yet another exemplary embodiment may include a method, comprising: by a wireless device: performing any or all parts of the preceding examples.

Another exemplary embodiment may include a wireless device, comprising: an antenna; a radio coupled to the antenna; and a processing element operably coupled to the radio, wherein the device is configured to implement any or all parts of the preceding examples.

Still another exemplary embodiment may include an apparatus, comprising: a processing element configured to cause a wireless device to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Any of the methods described herein for operating a user equipment (UE) may be the basis of a corresponding method for operating a base station, by interpreting each message/signal X received by the UE in the DL as message/signal X transmitted by the base station, and each message/signal Y transmitted in the UL by the UE as a message/signal Y received by the base station. Moreover, a method described with respect to a base station may be interpreted as a method for a UE in a similar manner.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:
1. A method, comprising:
performing a first bootstrapping procedure with a first edge server, the first bootstrapping procedure including generating a first key;
generating a first authentication code for a first edge enabler client (EEC) operating at a user equipment (UE), wherein the first authentication code is for use with the first edge server;
transmitting a first registration request for the first EEC to the first edge server, the first registration request including the first authentication code;
receiving, from the first edge server, a first registration success message comprising first information for authenticating with a second edge server;
generating a second authentication code for the first EEC, wherein the second authentication code is for use with the second edge server;
transmitting a second registration request for the first EEC to the second edge server, the second registration request including the second authentication code;

receiving, from the second edge server, a second registration success message comprising second information for discovery of a third edge server; and discovering the third edge server using the second information.

2. The method of claim 1, wherein the first authentication code is based on the first key and an identifier of the first EEC.

3. The method of claim 1, wherein at least one of the first authentication code and the second authentication code is generated using a SHA-256 hashing algorithm.

4. The method of claim 1, wherein the first edge server comprises an edge configuration server, the second edge server comprises an edge enabler server, and the third edge server comprises an edge application server.

5. The method of claim 1, further comprising exchanging application data of an application associated with the first EEC with the third edge server.

6. The method of claim 1, further comprising:
establishing communication with a cellular network;
performing a primary authentication with the cellular network;
receiving a UE identifier from the cellular network after the primary authentication, wherein the UE identifier is one of an IP multimedia private identity (IMPI) or temporary IMPI (TMPI); and
including the UE identifier as a username for the first bootstrapping procedure, wherein the first bootstrapping procedure comprises a generic bootstrapping architecture (GBA) procedure.

7. The method of claim 1, wherein the method further comprises:
performing a second bootstrapping procedure with the second edge server using the first information for authentication with the second edge server, the second bootstrapping procedure including generating a second key.

8. The method of claim 7, wherein the second authentication code is based on the second key and an identifier of the first EEC.

9. The method of claim 7, wherein the method further comprises:
generating a third authentication code for a second EEC operating at the UE, wherein the third authentication code is for use with the first edge server;
transmitting a third registration request for the second EEC to the first edge server, the third registration request including the third authentication code;
receiving, from the first edge server, a third registration success message comprising third information for authenticating with a fourth edge server;
generating a fourth authentication code for the second EEC, wherein the fourth authentication code is for use with the fourth edge server;
transmitting a fourth registration request for the second EEC to the fourth edge server, the fourth registration request including the fourth authentication code; and
receiving, from the fourth edge server, a fourth registration success message.

10. The method of claim 9, wherein the fourth edge server is the same as the second edge server.

11. The method of claim 9, wherein the fourth edge server is different from the second edge server.

12. The method of claim 9, wherein the third authentication code is based on the first key and an identifier of the second EEC.

13. The method of claim 1, wherein the first information for authenticating with the second edge server comprises a first token.

14. The method of claim 13, wherein the second registration request further includes the first token.

15. The method of claim 14, wherein the method further comprises:
generating a third authentication code for a second EEC operating at the UE, wherein the third authentication code is for use with the first edge server;
transmitting a third registration request for the second EEC to the first edge server, the third registration request including the third authentication code;
receiving, from the first edge server, a third registration success message comprising third information for authenticating with a fourth edge server;
generating a fourth authentication code for the second EEC, wherein the fourth authentication code is for use with the fourth edge server;
transmitting a fourth registration request for the second EEC to the fourth edge server, the fourth registration request including the fourth authentication code; and
receiving, from the fourth edge server, a fourth registration success message.

16. The method of claim 15, wherein the third information for authenticating with the fourth edge server comprises a second token.

17. An apparatus, comprising:
a processor configured to, when executing instructions stored in a memory, perform operations comprising:
perform a first bootstrapping procedure with a first edge server, the first bootstrapping procedure including generating a first key;
generate a first authentication code for a first edge enabler client (EEC) operating at a user equipment (UE), wherein the first authentication code is for use with the first edge server;
transmit a first registration request for the first EEC to the first edge server, the first registration request including the first authentication code;
receive, from the first edge server, a first registration success message comprising first information for authenticating with a second edge server;
generate a second authentication code for the first EEC, wherein the second authentication code is for use with the second edge server;
transmit a second registration request for the first EEC to the second edge server, the second registration request including the second authentication code;
receive, from the second edge server, a second registration success message comprising second information for discovery of a third edge server; and
discover the third edge server using the second information.

18. The apparatus of claim 17, further comprising:
a radio operably coupled to the processor.

19. A method, comprising:
performing a first bootstrapping procedure with a user equipment (UE) and a first edge server, the first bootstrapping procedure including generating a first key;
receiving, from the UE to the first edge server, a first registration request for a first edge enabler client (EEC) operating at the UE, the first registration reqeuest including a first authentication code, wherein the first authentication code is for use with the first edge server;

transmitting, to the UE from the first edge server, a first registration success message comprising first information for authenticating with a second edge server;

receiving, from the UE to a second edge server, a second registration request for the first EEC, the second registration request including a second authentication code, wherein the second authentication code is for use with the second edge server; and transmitting, to the UE from the second edge server, a second registration success message comprising second information for discovery of a third edge server.

20. The method of claim 19, wherein the first authencication code is base don the first key and an identifier of the first EEC.

* * * * *

UNITED STATES PATENT AND TRADEMARK OFFICE
CERTIFICATE OF CORRECTION

| | | |
|---|---|---|
| PATENT NO. | : 12,452,657 B2 | Page 1 of 1 |
| APPLICATION NO. | : 17/916960 | |
| DATED | : October 21, 2025 | |
| INVENTOR(S) | : Shu Guo et al. | |

It is certified that error appears in the above-identified patent and that said Letters Patent is hereby corrected as shown below:

In the Claims

Column 28 Line 63, delete "reqeuest" and substitute --request--.
Column 29, Line 12, delete "authenciciation" and substitute --authentication--.
Column 29, Line 12, delete "base don" and substitute --based on--.

Signed and Sealed this
Second Day of December, 2025

John A. Squires
*Director of the United States Patent and Trademark Office*